Aug. 7, 1956
C. RHODES
2,757,811
FORAGE BLOWER TRANSPORT
Filed June 1, 1953
2 Sheets-Sheet 1
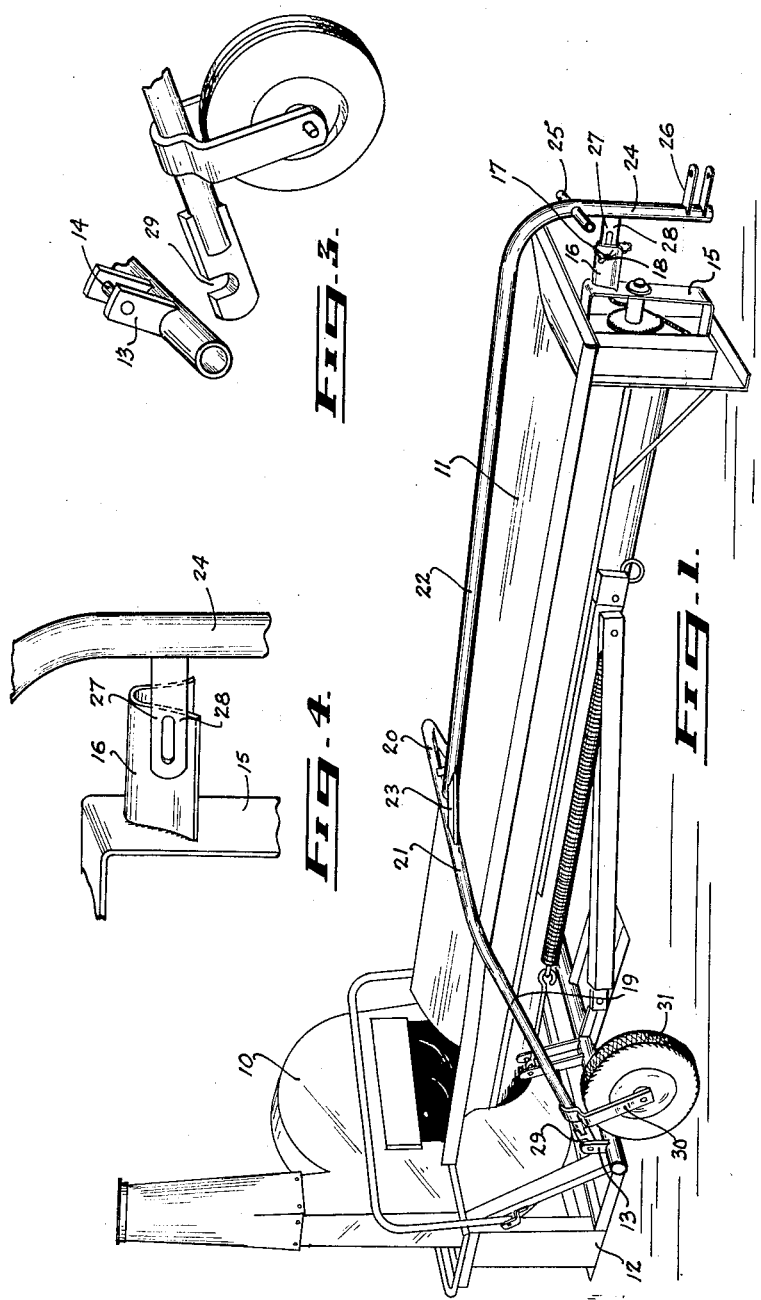
INVENTOR:
Cecil Rhodes
Bailey, Stephens & Huettig
Attorneys

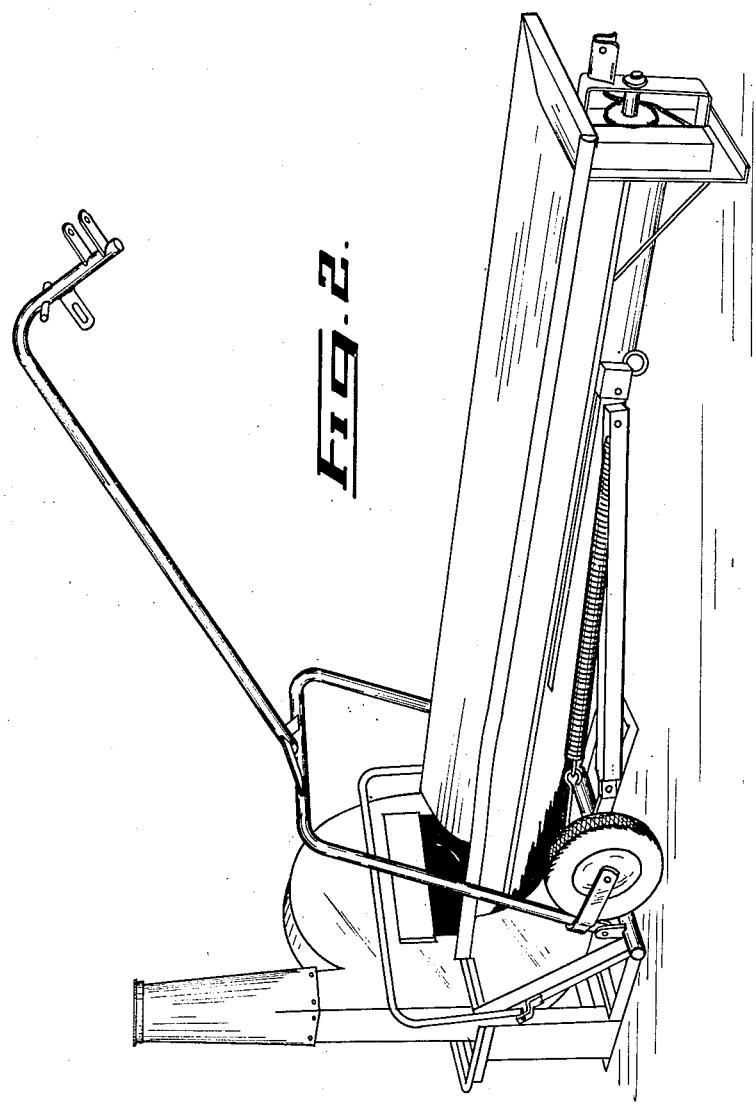

United States Patent Office 2,757,811
Patented Aug. 7, 1956

2,757,811

FORAGE BLOWER TRANSPORT

Cecil Rhodes, Brantford, Ontario, Canada, assignor to Cockshutt Farm Equipment Limited, Brantford, Ontario, Canada, a corporation of Canada Application June 1, 1953, Serial No. 358,860

Claims priority, application Canada February 13, 1953

2 Claims. (Cl. 214—373)

This invention relates to a device for transporting articles such as forage blowers and the like.

Forage blowers must be firmly mounted when they are in operating position at the silo or other location. However, it is often necessary to transport the blower from one location to another.

Most forage blowers are of such a size and weight that they cannot conveniently be transported by a truck and difficulty would be encountered in placing a forage blower on a truck in the absence of special hoisting equipment. Forage blowers have previously been provided with permanently attached wheels. However, it has been necessary to provide means for removing the wheels or resting them above ground level before the blower could be used. Time and trouble are involved in removing the wheels and also the necessity of replacing the wheels in lowered position for further transportation of the blower offers a difficulty. If the wheels are to remain on the forage blower provision must be made for raising and lowering the wheels, and in addition the wheels and the means for retracting the wheels are an unnecessary encumbrance to the equipment.

The object of this invention is to provide a device for transporting forage blowers and the like which can be completely detached from the forage blower when it is in operation but which can readily be positioned for further transportation of the blower.

A further object of this invention is to provide a transporting device which can be removed or be positioned on the blower with one end of the blower off the ground and with the equipment ready for hitching to the tractor or other means of locomotion entirely by hand, and in a rapid and efficient manner.

These and other objects and advantages are fulfilled by the transporting device described below, the inventive features of which are defined in the appended claims.

In the drawings which illustrate the preferred embodiment of this invention:

Figure 1 is a perspective elevation view showing the transport device in association with a forage blower which is in a raised position ready for removal to another location.

Figure 2 is a perspective elevation view corresponding to Figure 1 but showing the forage blower in lowered position.

Figure 3 is a detail view illustrating the connection of the hooks at the ends of the lifting arms of the transport device to the forage blower.

Figure 4 is a detail view illustrating the locking lug at the hitching end of the transport device being passed to one side of the socket on the blower.

In the drawings the article being transported is a forage blower including a blower unit 10 mounted at one end of a conveyor trough 11. The supporting framework 12 of the blower unit includes a pair of spaced parallel brackets 13, at each side of the unit, connected by horizontal engaging pins 14. At the hitching end of the blower the trough is provided with the vertical strap 15 to which is secured a downwardly facing socket 16 formed by a V-shaped strip. Apertures 17 in the sides of the strip receive locking pin 18.

The transporting device includes a framework consisting of spaced downwardly inclined lifting arms 19 and 20, the upper ends of which are connected by and are preferably integral with a crosspiece 21. A lever arm 22 is joined to the centre of crosspiece 21 and is connected thereto by bracing members 23. The lever arm extends longitudinally of the forage blower to the hitching end of the blower and merges into a downward extension. It will be noted that both the crosspiece and the lever arm are disposed above the vertically adjacent trough portion of the blower so that there will be no interference with the upward biasing of the lever arm.

The downward extension 24 of the lever arm is fitted with handles 25 to afford a hand grip and with a double, apertured hitch strap 26. A locking lug 27 extends inwardly from extension 24 into engagement with socket 16. Lug 27 has a slot 28 which provides an aperture for the reception of locking pin 18.

The lower ends of each of lifting arms 19 and 20 have upwardly directed lifting hooks 29 which engage pins 14. A strap 30 is secured to each of lifting arms 19 and 20 adjacent to hooks 29 to provide a mounting for wheels 31.

When it is desired to elevate the blower into transport position, all necessary adjustments are made to the blower or other article being transported. Thus in the case of the blower illustrated the blower unit 10 and conveyor trough 11 are locked together to prevent pivoting of the conveyor with respect to the blower. Hooks 29 are engaged with pins 14 as shown in Figure 2 and lever arm 22 is biased downwardly. It acts about the fulcrum of wheels 31 to elevate the blower unit end of the forage blower. The flexibility of the single lever arm 22 is such that the locking lug 27 can be passed to one side of socket 16 as illustrated in Figure 4. Lug 27 is lowered below socket 16 and is raised into locking engagement with the socket as shown in Figure 1. Locking pin 18 is placed in position and the unit is then ready for transportation. The reverse procedure to the above is followed to lower the forage blower into position on the ground.

It will be appreciated that other equivalent locking arrangements can be used in place of lug 27 and socket 16. Thus an upwardly facing socket could extend inwardly from extension 24 of the transport device. This would engage a locking lug on the blower. Furthermore, other couplings such as a hook engaging a pin could be used. The coupling should include a positive stop equivalent to socket 16 to prevent extension 24 moving upwardly relatively to the end of the blower.

It will be apparent from the foregoing that the transporting device of this invention provides a simple, convenient and inexpensive means for achieving the objects set forth.

I claim:

1. A device for transporting an article comprising a pair of spaced downwardly inclined lifting arms, one on each side of said article, an upwardly directed hook at the lower end of each lifting arm cooperating with horizontally extending pins on the article, a wheel mounting secured to each of said arms adjacent to the lower end thereof, a wheel carried by each of said wheel mountings, a crosspiece joining the upper ends of said arms, a lever arm extending longitudinally of the article from the crosspiece to the end of the article, said crosspiece and lever arm being above vertically adjacent portions of the article, a downward extension at the end of the lever arm remote from the crosspiece, said lever arm being adapted to bias about said wheels as a fulcrum between a horizontal position with the article raised and an inclined position with the extension to the lever arm elevated, with the article lowered, and with said hooks disengaged, a locking lug directed inwardly from said extension and engaging a downwardly facing socket on the article, said locking lug being normally in vertical alignment with said socket and said lever arm being resilient to enable the locking lug to pass to one side of the socket, and a hitch connection on said extension.

2. In a transporting device for carrying an article, a framework, releasable couplings between said framework and one end of the article, wheels mounted on said framework adjacent to said couplings and being between said couplings and the other end of the article, said framework including a lifting member disposed at said other end of the article, the weight of said article when in elevated position tending to cause said lifting member to swing upwardly, a locking lug on said lifting member engaging a downwardly facing socket at the other end of the article, said framework being sufficiently resilient to allow said locking lug either to be engaged with said socket or to be passed to one side of the socket for elevation of said lifting member to lower said article, and means for locking said locking lug in place in the socket comprising a locking pin insertable through aligned opening in the locking lug and socket.

References Cited in the file of this patent

UNITED STATES PATENTS

| | | |
|---|---|---|
| 2,375,754 | Ballinger | May 15, 1945 |
| 2,415,771 | Van Agtmael | Feb. 11, 1947 |
| 2,456,868 | Dominic | Dec. 21, 1948 |
| 2,488,657 | Biszantz et al. | Nov. 22, 1949 |
| 2,562,596 | Bonfietti | July 31, 1951 |
| 2,594,540 | Cole et al. | Apr. 29, 1952 |
| 2,603,501 | Graves | July 15, 1952 |
| 2,626,072 | Holsclaw | Jan. 20, 1953 |
| 2,634,010 | Sass | Apr. 7, 1953 |